(12) United States Patent
So

(10) Patent No.: US 7,849,016 B2
(45) Date of Patent: Dec. 7, 2010

(54) INTERNET-BASED DATA CONTENT RENTAL SYSTEM AND METHOD

(76) Inventor: Vincent So, 529 Chapel Street, Ottawa, Ontario (CA) K1N 8A1

( * ) Notice: Subject to any disclaimer, the term of this patent is extended or adjusted under 35 U.S.C. 154(b) by 1002 days.

(21) Appl. No.: 10/702,540

(22) Filed: Nov. 7, 2003

(65) Prior Publication Data
US 2004/0139024 A1   Jul. 15, 2004

Related U.S. Application Data

(60) Provisional application No. 60/433,991, filed on Dec. 18, 2002.

(51) Int. Cl.
*G06F 21/00* (2006.01)
*G06F 7/04* (2006.01)

(52) U.S. Cl. .............. 705/59; 705/51; 705/75; 713/183; 726/27

(58) Field of Classification Search ............ 705/51, 705/59; 726/27, 31; 713/183
See application file for complete search history.

(56) References Cited

U.S. PATENT DOCUMENTS

| | | | |
|---|---|---|---|
| 6,334,189 B1* | 12/2001 | Granger et al. ............ 726/26 |
| 6,611,812 B2 | 8/2003 | Hurtado et al. ............ 705/26 |
| 6,882,728 B1 | 4/2005 | Takahashi et al. | |
| 7,114,073 B2* | 9/2006 | Watanabe ............ 713/176 |
| 7,251,833 B2* | 7/2007 | Feig et al. ............ 726/27 |
| 2002/0078361 A1* | 6/2002 | Giroux et al. ............ 713/183 |
| 2002/0141582 A1 | 10/2002 | Kocher et al. | |
| 2002/0170053 A1* | 11/2002 | Peterka et al. ............ 725/31 |
| 2003/0046539 A1* | 3/2003 | Negawa ............ 713/163 |
| 2003/0097655 A1* | 5/2003 | Novak ............ 725/31 |
| 2003/0223583 A1* | 12/2003 | Stirling et al. ............ 380/216 |
| 2004/0114762 A1* | 6/2004 | Medvinsky ............ 380/277 |
| 2006/0053077 A1* | 3/2006 | Mourad et al. ............ 705/51 |
| 2006/0218651 A1* | 9/2006 | Ginter et al. ............ 726/27 |

FOREIGN PATENT DOCUMENTS

WO   WO 2004/057875   7/2004

OTHER PUBLICATIONS

Associated Press, Films to be rented on Internet, Nov. 11, 2002.

* cited by examiner

*Primary Examiner*—Charles C Agwumezie

(57) ABSTRACT

Systems and methods of distributing and controlling use of data content are provided. Data content is distributed to users by a service provider system, shared between computer system users, or both. In one embodiment, data content is segregated into a plurality of sections, each section is encrypted using a respective one of a plurality of encryption keys, and the resultant plurality of encrypted sections is downloaded to a customer processing platform. In order to control the use of the data content, a plurality of decryption keys corresponding to the plurality of encryption keys are then delivered to the customer processing platform in a manner such that the customer processing platform has possession of at most a subset of the plurality of decryption keys at any time. According to another embodiment, downloaded data content is adapted for use only with a particular software component that establishes a connection with a data content service provider system to obtain permission to use the data content.

43 Claims, 4 Drawing Sheets

INTERNET-BASED DATA CONTENT RENTAL SYSTEM AND METHOD

CROSS-REFERENCE TO RELATED APPLICATION

This application claims priority from U.S. Provisional Patent Application Ser. No. 60/433,991, filed on Dec. 18, 2002. The entire contents of this provisional application are hereby incorporated herein by reference.

FIELD OF THE INVENTION

The invention relates to systems and methods for renting and distributing data content such as music and video.

BACKGROUND OF THE INVENTION

Video rental stores have provided a sort of "video on demand", subject, of course, to the high cost of video cassette purchases by the rental stores, as well as the high capital outlay for real estate (land and building) and the cost of labor at the stores. Even when a video becomes available through video release, a viewer's ability to watch the video at a chosen time is subject to availability of the video at the store, round-trip transportation to the store and the potential problems with late returns, damaged videos, lost videos, etc.

True video-on-demand has been envisioned whereby massive video servers would be positioned in various geographic locations to transfer high speed video data streams to the houses of individual viewers at any time a viewer wishes to access a particular movie or other content. However, this type of video demand system, after years and billions of dollars of investment, has proven to be too complex and expensive and, therefore, has not been implemented.

A type of on-demand video distribution system is described in U.S. Pat. No. 5,832,287, whereby video-on-demand and network programming is provided from master file and network program databases through multiple community systems, each of which may serve up to approximately one hundred homes. The '287 systems have severe limitations in terms of storage capability and customer options.

An interactive viewing system that automatically records selected programs is disclosed in U.S. Pat. No. 5,805,763. However, the '763 system simply provides another mechanism for recording television programs. This system attempts to simplify the VCR recording function, but has not been widely adopted because of its complex nature and limited benefits.

A system that "blanket" transmits video/audio content such as movies, via satellite downlink transmission, for example, to each customer's recording, storage and playback system is disclosed in United States Patent Application 20020056118. Customers may pre-select from a list of available movies or other content in advance using an interactive screen selector, and then pay for the content that is actually viewed. This system just broadcasts movies, and the viewer typically has very limited choices.

According to another known rental and distribution scheme, subscribers pay a monthly flat rate, and visit an Internet site to choose movies to rent. Up to three movies at a time are then mailed directly to the subscribers, who can keep the rentals as long as they like, without incurring late fees. New movies can be rented as soon as previous rentals are returned in a postage-paid envelope provided with each rental.

Other known systems such as Intertainer™ and Movielink™, a joint venture of MGM Studios, Paramount Pictures, Sony Pictures Entertainment, Universal Studios and Warner Bros. Studios, allow consumers to legally obtain and watch movies on a personal computer. After choosing a film and paying for it by credit card, viewers download it to their computer's hard drive, where it can be stored for up to 30 days. However, once the viewer selects a "play" function for the film, it may be watched as often as a consumer likes in a 24-hour period, after which any downloaded files for the film are deleted. In this approach, copy protection can potentially be compromised since all information necessary to decrypt film files is stored on the viewer's computer.

SUMMARY OF THE INVENTION

According to an aspect of the invention, a method of delivering data content from a data content provider to a customer processing platform and controlling use of the data content at the customer processing platform comprises encrypting each of a plurality of sections of the data content using a respective one of a plurality of encryption keys to produce a corresponding plurality of encrypted sections, delivering the plurality of encrypted sections to the customer processing platform, and delivering to the customer processing platform a plurality of decryption keys corresponding to the plurality of encryption keys, wherein the decryption keys are delivered in a manner such that the customer processing platform has simultaneous possession of at most a subset of the plurality of decryption keys at any time.

In accordance with another aspect of the invention, a method of receiving and controlling playback of data content at a customer processing platform comprises receiving over a communications medium a plurality of encrypted sections of data content, each of which has been encrypted using a respective encryption key, and for each encrypted section, receiving a decryption key in respect of the encrypted section, decrypting and playing back the encrypted section using the decryption key, and destroying the decryption key after completing playback of the encrypted section.

In another aspect, the invention provides a method of ordering data content for delivery over a communication network comprising displaying product or service information associated with a service provider at a customer interface of an interactive device accessible to a customer, registering the customer with the service provider, transmitting customer verification information and order information requesting data content, input by the customer using the customer interface, to the service provider, comparing the customer verification information with corresponding customer verification information accessible to the service provider, and, where the customer verification information matches the corresponding customer verification information accessible to the service provider, segregating the requested data content into a plurality of sections, encrypting each section of the data content with a respective encryption key, delivering the encrypted data content to the interactive device, and billing an account of the customer.

The invention also provides, in another aspect, a method for controlling use of encrypted data content downloaded to a customer data content processing device comprising receiving a request comprising customer verification information from a customer data content processing device, comparing the customer verification information with corresponding stored customer information, and, where the customer verification information is consistent with the stored customer verification information, billing a usage charge to an account of the customer, transmitting to the customer data content processing device a digital key to decrypt a current portion of the encrypted data content, and for each subsequent portion of the encrypted data, transmitting to the customer data content processing device a different key to decrypt the subsequent portion of the encrypted data and causing a key for a preceding portion of the encrypted data to be deleted from the customer data content processing device.

According to a further aspect of the invention, a computer readable medium storing software code executable by a processing platform, the software code comprising first software code for coordinating downloading data content to a customer computer system from a data content service provider system or another customer computer system and second software code for establishing a connection with the data content service provider system to obtain permission to use the data content, and for using the data content where permission is obtained from the data content service provider system.

In a still further aspect, the invention provides a signal embodied on a transmission medium containing software code executable by a processing platform, the software code comprising first software code for coordinating downloading data content to a customer computer system from a data content service provider system or another customer computer system and second software code for establishing a connection with the data content service provider system to obtain permission to use the data content, and for using the data content where permission is obtained from the data content service provider system.

A system for delivering data content from a data content provider to a customer processing platform and controlling use of the data content at the customer processing platform, according to another aspect of the invention, comprises means for encrypting each of a plurality of sections of the data content using a respective one of a plurality of encryption keys to produce a corresponding plurality of encrypted sections, means for delivering the plurality of encrypted sections to the customer processing platform, and means for delivering to the customer processing platform a plurality of decryption keys corresponding to the plurality of encryption keys, wherein the decryption keys are delivered in a manner such that the customer processing platform has simultaneous possession of at most a subset of the plurality of decryption keys at any time.

In another aspect, the invention provides a data content distribution system comprising a data content server configured to receive download requests and permission requests for data content, to encrypt a plurality of sections of requested data content using respective encryption keys to thereby generate a plurality of encrypted sections and to transmit the encrypted sections of the data content in response to a received download request for the data content, and to transmit each of a plurality of decryption keys respectively corresponding to the encryption keys in response to a permission request for the data content and a data content download controller configured to generate download requests, to receive encrypted sections of data content in response to download requests, to generate permission requests when downloaded data content is to be used, and for each encrypted section of data content to be used, to receive a corresponding one of the plurality of decryption keys, and to decrypt the encrypted section using the corresponding one of the plurality of decryption keys.

BRIEF DESCRIPTION OF THE DRAWINGS

The foregoing summary, as well as the following detailed description of preferred embodiments of the invention, will be better understood when read in conjunction with the appended drawings. It should be understood, however, that the invention is not limited to the precise arrangements shown. In the drawings.

DETAILED DESCRIPTION OF THE PREFERRED EMBODIMENTS

Data networks such as the Internet are not well suited for transmitting time sensitive information such as video for real-time processing at a receiver, due to such effects as latency and jitter associated with burst transmission schemes often used in such networks.

Asynchronous processing techniques combine the functionality of recording data on storage media, such as a hard drive or a digital video disk, with the ability to remotely access and download information for recording on these media through a data network. For example, data files for movies can be downloaded, stored, and then viewed at a later time. In a pay-per-use system, the downloading process requires some degree of control, to restrict access to and provide protection for the downloaded information so as to avoid unauthorized copying, for instance. Customer billing represents another important consideration in such systems.

Figure 1:
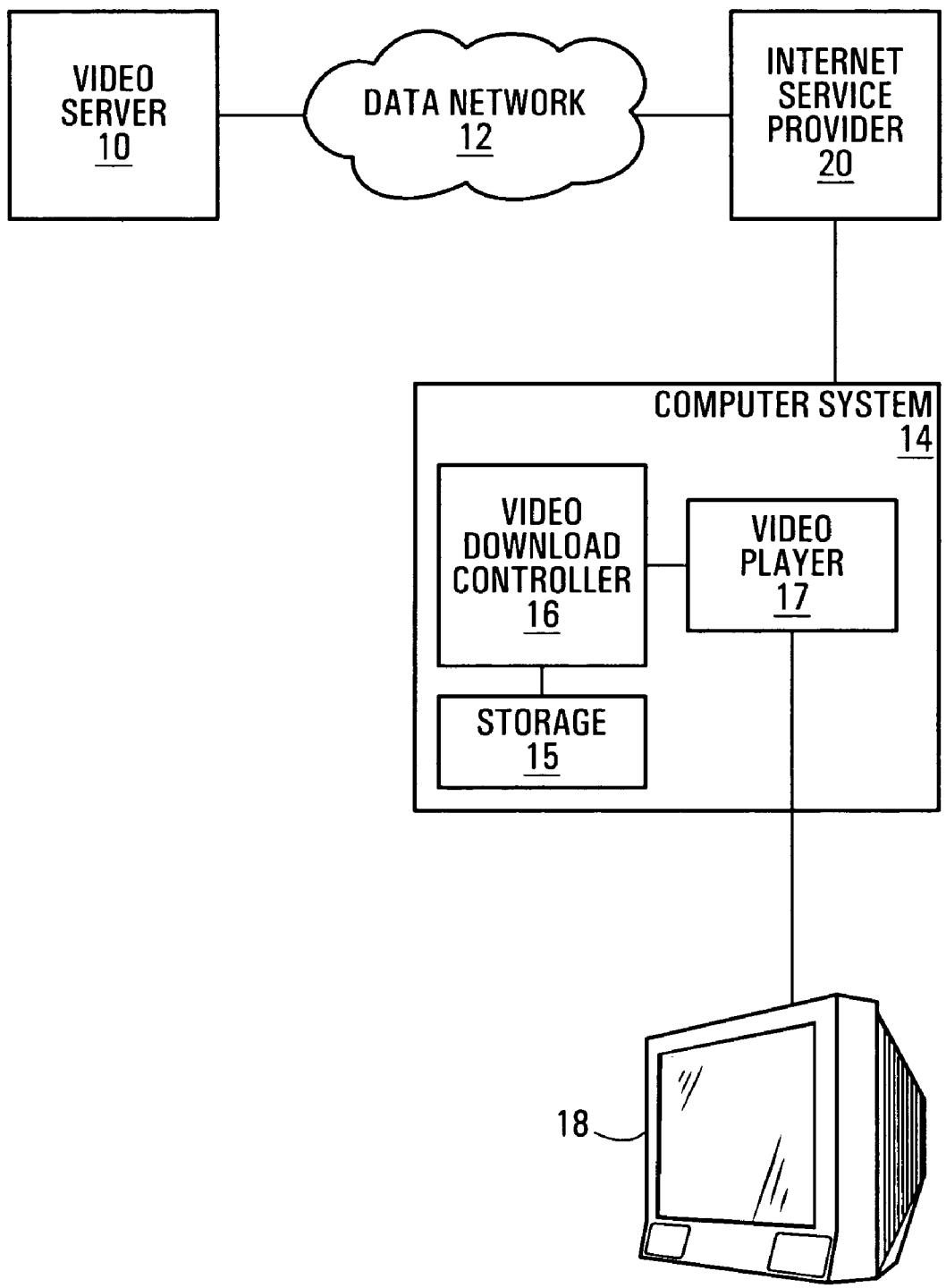
FIG. 1 is a block diagram representation of the components of an embodiment of the rental system of the present invention.

FIG. 1 is a block diagram representation of the components of an embodiment of the rental system of the present invention. The system includes a video server 10 connected to a data network 12, illustratively the World Wide Web or Internet, but more generally any appropriate data network. The Internet service provider (ISP) 20 connects the data network 12 to a computer system 14. The computer system 14 includes a video download controller 16, a storage device 15, and a video player 17. The computer system 14 and the video download controller 16 together are adapted to control the display of video on the video player 17 in the computer system 14 and other devices, if any, connected to the computer system 14, such as a television 18.

It should be appreciated that the system shown in FIG. 1 is one example of a rental system according to an embodiment of the invention. The techniques disclosed herein are applicable to systems comprising further, fewer, or different components than those explicitly shown in FIG. 1. Normally, any data server such as the video server 10 serves a plurality of users. Similarly, the service provider 20 is not normally implemented for a single user as shown in FIG. 1. The data network 12 also connects multiple servers, service providers, and users in most implementations. In addition, video is one illustrative example of data content. The present invention is not restricted to any particular type of data content, although video and music represent two types of data content that are often rented.

The video server 10 is established at a location on the data network 12 where customers may gain access to its video content. In one embodiment, the location is a website which includes number of web pages. These web pages preferably require a customer to enter authorization information in order to gain further access, and may also include further information about the content available through the video server 10. In another embodiment, the video server 10 includes a database that stores video content and possibly user information associated with users that are authorized for access to the stored video content.

The computer system 14 is preferably a personal computer, and is capable of establishing a connection to the video server 10 through the service provider 20. However, it is to be understood that any appropriate mechanism of establishing the connection to the video server 10 may be employed. The storage device 15 is configured to store content downloaded to the computer system 14 as described in further detail below. For large file downloads such as movie files, a hard disk drive or other high capacity storage device is preferred, although the storage device 15 may also or instead comprise one or more of a compact disk device, a digital video disk device, a solid-state memory, and other types of memory systems. It will be apparent to those skilled in the art that the memory device 15 need not be dedicated to storing downloaded content, and is typically accessible to other components of the computer system 14 in addition to the video download controller 16.

The video download controller 16 preferably comprises a software module or program running on the computer system 14. In a preferred embodiment, the video download controller 16 is a plug-in adapted to run together with a browser on the computer system 14. In other embodiments, the video download controller 16 is any appropriate software installed on the computer system 14 which is capable of controlling the download and subsequent playing of data content, video content in FIG. 1. A software-based video download controller 16 may itself be downloaded onto the computer system 14, such as when a user first subscribes to a video rental service supported by the video server 10. Playback of video content is effected in the system of FIG. 1 via the television 18, although other video playback devices, including a monitor in the computer system 14 or a video projector, for example, may also or instead be used for video playback in other embodiments.

In operation, a customer establishes a connection between the computer system 14 and the video server 10 through the service provider 20 and the data network 12. This connection is typically established using a web browser that the customer uses when accessing servers such as the video server 10 on the data network 12. The video download controller 16 is preferably incorporated into the web browser as a plug-in that controls the processes performed during the download and viewing of video content.

According to one embodiment, the video download controller 16 includes a user or customer interface that facilitates the exchange of customer verification information and subsequent rental selection information between a customer, at the computer system 14, and the video server 10. Customer verification information includes such information as a network address of the computer system 14, a customer email address, or a customer or account identification number. Customer verification information is also stored at the video server 10 for all properly registered customers or subscribers. It should be appreciated that the customer verification information may include more than one type of customer-related information. For example, access to the video server 10 by any customer may be restricted to particular computers or locations where customer verification information includes both a customer ID and a network address. In this case, the video server 10 grants access to its data content only if a customer establishes a connection from a predetermined network address. However, more common password-based access control is also contemplated for the video server 10. In other embodiments, the network address of the computer system 14 is transferred to the video server 10 as a destination address for file downloading as described in further detail below, and access control is based on other customer verification information provided to the video server 10.

After a connection between the computer system 14 and the video server 10 has been established, including successful completion of logon procedures, if any, the customer is provided with an indication of available data content, from which desired rental selections are made. Upon receiving rental selection information from the customer, the video server 10 encrypts selected data content, using any known encryption algorithm and either a public or secret encryption key, and the encrypted data content is delivered to the customer using the data network 12. The encrypted data content is then received at the computer system 14 by the video download controller 16, which stores the encrypted data content in the storage device 15.

At this point, the customer has downloaded and stored only encrypted data content. Although the encryption key used to encrypt the data content may be public or secret, decryption requires a secret key that is known only to the video server 10. The secret decryption key is the same as the secret encryption key in symmetric encryption schemes, whereas according to other encryption schemes, different encryption and decryption keys are used. In public key systems, for example, a public/private key pair is used. The encryption key is a public encryption key, and the secret decryption key is a corresponding private key.

Thus, to use the data content, the customer must first obtain the required secret decryption key. In one embodiment, the customer requests the decryption key from the video server 10. After the video server 10 has authenticated the user, by checking a network address of a computer system from which a decryption key request is received, a password for a customer account, a digital signature on a key request, or some combination thereof, for example, the appropriate key is identified and transmitted to the customer in real time.

In a preferred embodiment, encrypted data content is protected by a set of cryptographic keys. Each key can only decrypt a particular section of the encrypted data content. Key distribution is controlled such that a customer is in possession of less than the entire set of keys, preferably only a single key, at any time. When a decryption key for a section of the encrypted data content is sent to a customer, the video download controller 16 deletes one or more keys, as well as decrypted data content, for other sections of the encrypted data content. Storage of keys and decrypted data content at a customer's computer system is also preferably controlled to prevent storage of any keys or decrypted content to permanent memory. These measures render copying of data content for reproduction or access after a rental or subscription period has expired more difficult.

The video download controller 16 also controls playback of downloaded video content. Where multiple-key protection is implemented, the video download controller 16 preferably requests each decryption key as it is needed to play back sequential sections of encrypted video. To view each section, another digital key is downloaded from the video server 10, and the digital key and any remaining decrypted video content that may have been temporarily stored during playback for the previous section are destroyed, by deletion from memory, for example.

In this manner, content downloading and key downloading need not be performed at the same time. Bulky data content is downloaded and stored at a local storage device 15, and then only the required decryption keys, which tend to be substantially smaller than the data content, need be downloaded in real time during video playback or other operations involving video or other types of data content. Although data networks such as the Internet are not particularly well suited to real-time transfer of time sensitive data content, downloading of encrypted content and subsequent real-time downloading of decryption keys provide the benefits of wide data content distribution and availability while maintaining a high level of control over copying and other unauthorized use of data content.

In a more general sense, the video download controller 16 may be considered as one specific embodiment of a customer processing platform. Delivery and play-back of data content at such a processing platform is then controlled by encrypting each of a plurality of sections of the data content using a respective plurality of keys, customer processing platform-specific keys in some embodiments, to produce a corresponding plurality of encrypted sections. The encrypted sections are delivered over a communications medium to the customer processing platform in response to a request for the data content, for example. The keys are then delivered to the customer processing platform in such a manner that the customer processing platform is never simultaneously in possession of all of the keys. As described above, symmetric key cryptography involves the same keys for encryption and decryption operations. However, the present invention is in no way limited to symmetric key techniques. Therefore, references to keys in the context of decryption should be understood to include decryption keys that correspond to, but are not necessarily the same as, the encryption keys used to encrypt data content.

Several options exist for determining customer processing platform-specific keys. Key determination based on unique customer processing platform identifiers is generally preferred so that each customer processing platform has a unique key or set of keys. A network address such as an IP address or hardware identifiers associated with a computer system upon which the customer processing platform is operating are two illustrative examples of possible unique identifiers. In one embodiment, decryption key generation seed values are combined with or transformed using such a unique identifier to generate the decryption keys. Transfer of the key generation seed values to a customer processing platform for corresponding transformation into required decryption keys allows data content decryption to be restricted to a particular computer system or location. Mappings between customer processing platforms and the corresponding keys or seed values are preferably maintained at a data content provider, in a mapping table in memory, for instance.

According to another embodiment, a decryption key is transformed at a data content provider using such a unique customer processing platform identifier. In a simple illustrative example of this embodiment, each decryption key $A_n$ required to decrypt downloaded data content is transformed using a network address B associated with a user's computer system to generate a respective transmission value $C_n = A_n - B$. Each transmission value is then sent to the customer processing platform for decryption of encrypted blocks of the data content in the manner described herein. The customer processing platform then performs a reverse transformation on the transmission value to recover the decryption key, as $C_n + B = A_n$ in this example. The unique identifier B is preferably extracted from the customer processing platform or the processing device on which the platform operates and cannot be mimicked by other platforms or systems or changed by users. As above, decryption of data content is restricted to a particular computer system or customer processing platform. However, this type of key management scheme allows a data content server to use a common set of keys for multiple users. The data content is encrypted with a set of keys, independent of users. Even if transmission values are intercepted by other users, decryption keys can only be recovered on the specific computer system or customer processing platform for which each transmission value was destined.

In some embodiments, delivery of the customer processing platform-specific keys or transmission values involves providing key control software at the customer processing platform. The key control software is configured to receive a key or transmission value for a given section of encrypted data content, to decrypt the given section, and then destroy the key. As described above, the key control software also preferably deletes any keys for other sections of encrypted data content that are accessible to the customer processing platform.

Maintaining control over decryption keys enables implementation of any of several different billing models. In one embodiment, a customer is billed first for downloading data content and then for each time keys for the data content are downloaded, to view a movie for example. In another embodiment, data content downloads are free, and a customer is billed for the keys.

Figure 2:
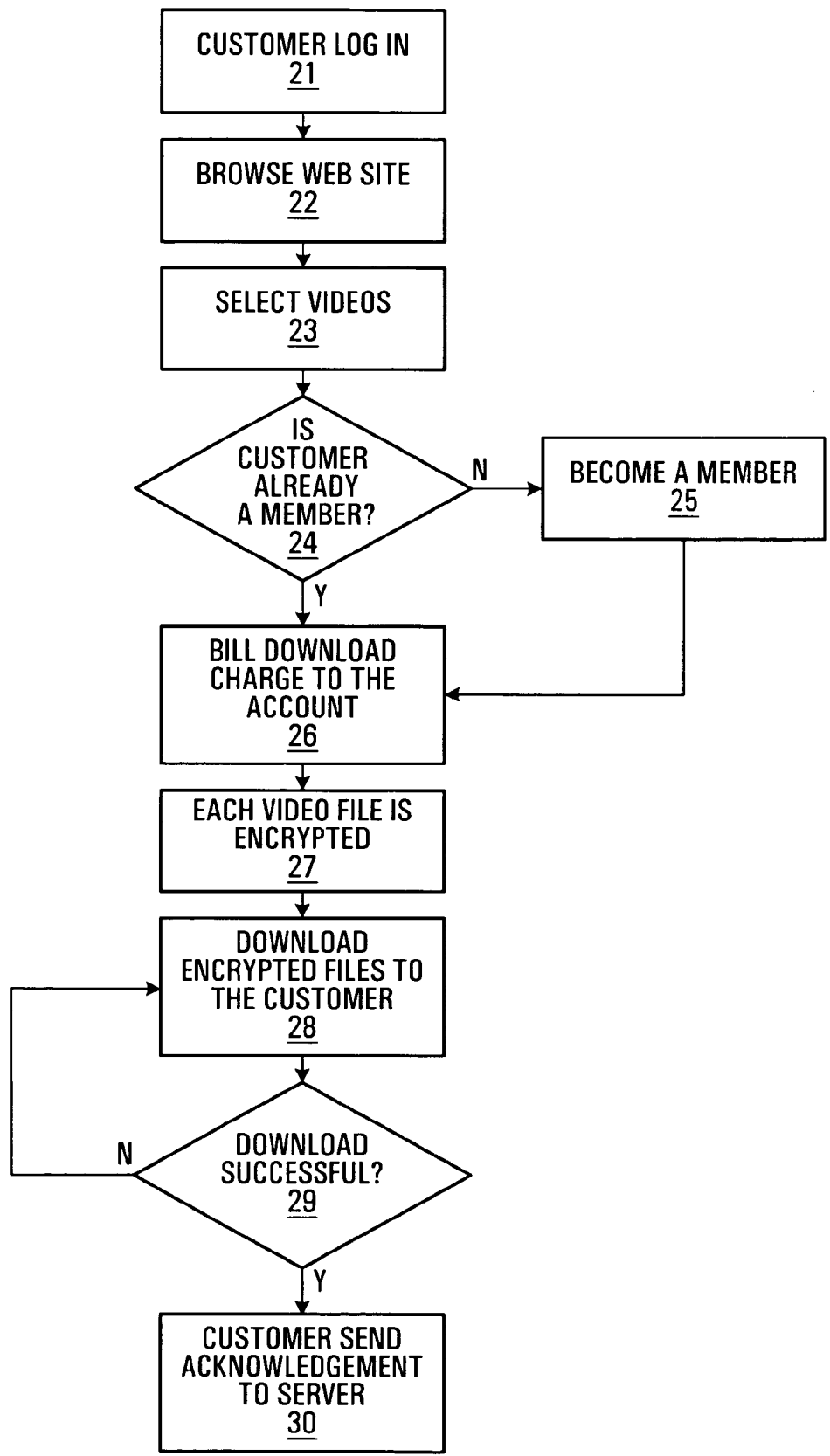
FIG. 2 is flow chart of a method of retrieving data content.

FIG. 2 is flow chart of a method of retrieving data content, illustratively video content. At 21, a customer establishes a connection with a video rental system and logs in. As described above, content downloads may be free, in which case access control by login may instead be associated with decryption keys. Also, login may not be required in the event that automated identification systems, such as cookies stored on a user's computer system, are employed.

At 22, the customer browses available video content, via a website in the example method of FIG. 2, and selects one or more videos at 23. At this point, or previously in the process, if the customer is not already a video rental service subscriber or member, as determined at 24, the customer proceeds through any necessary operations to become a member, as shown at 25. Membership registration typically involves a user entering identification information and billing information such as a credit card number. Of course, if a customer decides not to become a member, the method may be terminated, particularly where customers are charged for content downloads, as in FIG. 2.

Next, a charge is applied to the customer's account at 26, in respect of the video or videos to be downloaded, although the charge can actually be applied at any time during the download process.

At 27, encryption is applied to each of a plurality of sections of each video to be downloaded. For example, if a video is to be downloaded in four sections, then encryption is applied to each of the four sections in step 27. In a preferred embodiment, encryption is performed using customer-specific keys, related to the IP address of a computer system from which the customer accesses the video rental system. However, in other embodiments, the key is based on various hardware parameters that can be read from the customer's computer system and are preferably incapable of being mimicked by other machines. In still further embodiments, the keys are not customer-specific, such that one set of keys is used to encrypt data content for distribution to any of a plurality of users.

After the various sections of the video file or files have been encrypted, the encrypted sections are downloaded to the customer at step 28. This download is performed either immediately following encryption or at a later scheduled time, such as during the night when network traffic is lower. At step 29, if the download was unsuccessful then further attempts may be made to download the encrypted files. Otherwise, at step 30, the customer's computer system sends an acknowledgement to the video rental system that the download was successful. At this point, the customer's computer system has a series of encrypted sections of each selected video.

A method for ordering data content for delivery is thereby provided. A customer browses product or service information at a customer interface accessible to the customer on an interactive device, such as an Internet browser on a computer system. If necessary, the customer is registered for service with a data content provider server or rental system, preferably using a network registration transmitting device embodied in the same computer system. As will be apparent, registration typically includes entering or otherwise providing customer verification information, such as described above.

After particular data content has been selected, order or selection information, and customer verification information where customer login is required and the customer has not yet logged into the data content provider server, are transmitted to the data content provider server. The data content provider server compares the customer verification information with locally stored corresponding customer verification information, and in the event that the locally stored and transmitted customer verification information match, the order information is processed. Ordered data content is encrypted with a set of digital keys such that different sections of the data content are encrypted with different keys. In a per-download billing model, a customer account is billed either at download time or upon confirmation that encrypted data content has been received.

Figure 3:
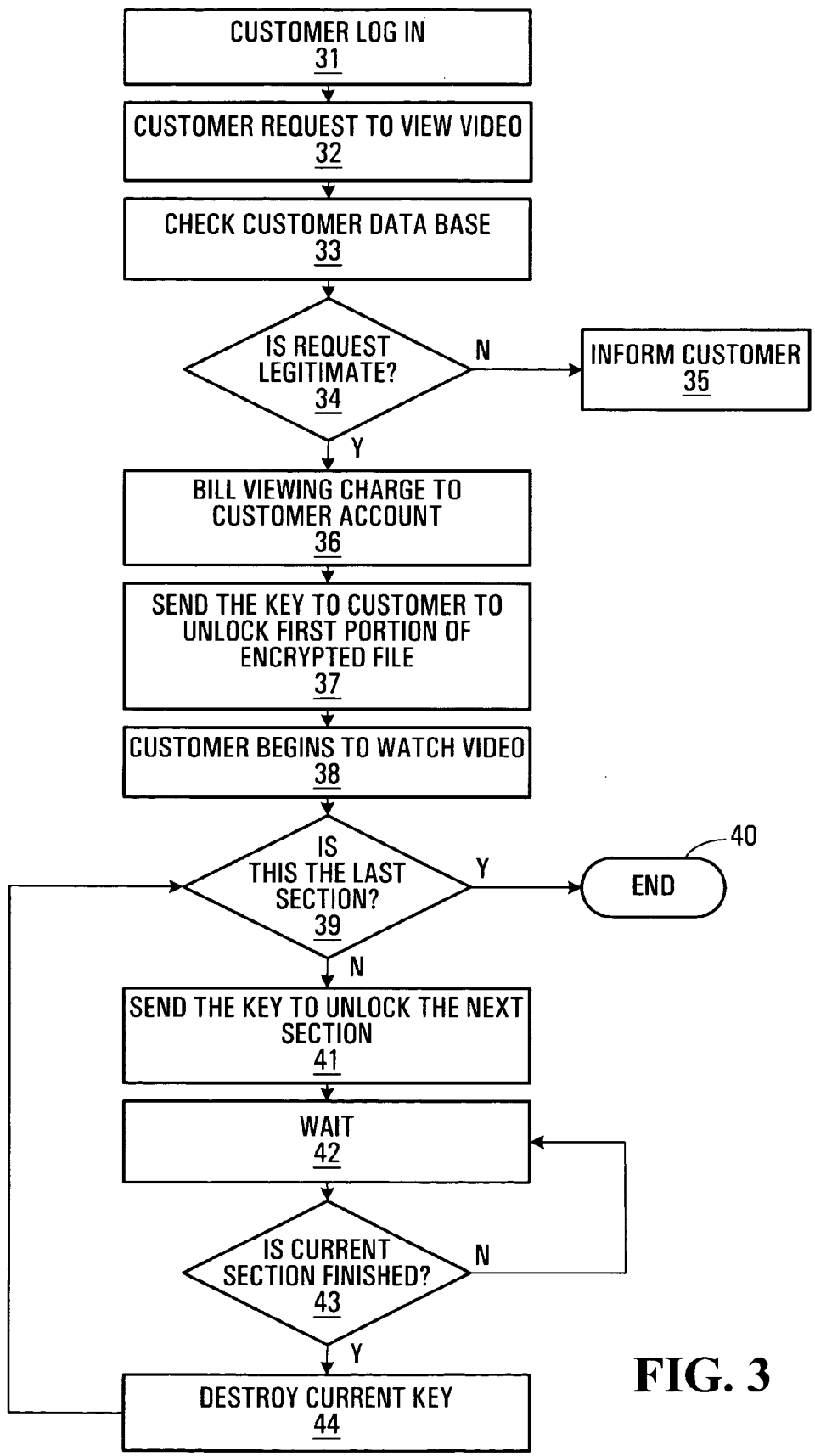
FIG. 3 is flow chart of a method of processing data content.

FIG. 3 is flow chart of a method of processing data content, illustratively video content. In FIG. 3, it is assumed that the video content has already been downloaded by a customer.

At step 31, the customer logs in or otherwise establishes an identity with a video server or rental system. At 32, the customer requests to view a previously downloaded video or to download a decryption key required to view the video. Preferably, the video download controller 16 has a simple mechanism for selecting a previously downloaded video for viewing.

At step 33, a customer database or other local store at the video server is accessed, and at step 34, if the request is not legitimate then the customer is informed at step 35. A customer request is deemed not to be legitimate, for example, when it is submitted from a different computer system than that associated with the customer in the customer database, the customer has not registered with the video server, the customer account is not in good standing, or the video server has no record of the customer having downloaded the video for which viewing has been requested. The customer database may contain such information as username, address, telephone number, credit card information, email address, password, user profile, and rental and account records.

Otherwise, at step 36, a viewing charge is applied to the customer's account. At step 37, a first key which enables decryption or "unlocking" of a first section of the previously downloaded encrypted video content is sent to the customer. At the customer's computer system, the key is handed directly to a video download controller, which has exclusive access to the key and thus is the only component of the customer's computer system that is capable of performing decryption of the encrypted content. The first section of the downloaded encrypted video is decrypted and displayed at step 38.

The next series of steps, 39 through 44, are repeated for each section of the video being viewed. In the event that the current section being viewed is the last section of the video, as determined at 39, the process ends at step 40. Otherwise, at step 41 the next key is sent to unlock the next section. Then a "holding pattern" is entered, as shown at 42 and 43, to await completion of playback of the current section. After the current section is finished, the current key is destroyed at step 44 and the next section is decrypted and viewed.

It should be appreciated that step 41 may instead be responsive to separate requests for keys for subsequent sections of a downloaded encrypted video, to enable a customer to stop a video playback and resume the playback operation at a later time. It is also contemplated that a playback operation need not necessarily start at a first section of a downloaded encrypted video. Incremental billing, including per-key billing for instance, may be preferred where such partial viewing is enabled.

In an example implementation of the above method, a customer establishes a connection with a video rental service provider's web site and makes a request to view a video. The customer is preferably required to enter certain information such as membership authorization, email address, network address, or credit card information in order to gain permission to view the video. After the customer information has been verified by the rental service provider, permission is granted and a charge is billed to the customer's account or credit card. A key for the first section is then transmitted to the user. In order to prevent use of the key by a party that intercepts the key transmission, a secure channel or transfer mechanism is preferred. In one embodiment, the key itself is encrypted using a public cryptographic key corresponding to a private cryptographic key known only to the customer. Other secure transfer mechanisms will be apparent to those skilled in the art.

Some time after the key is received, the customer starts to view the first section of the video. When, or preferably before, the video playback reaches a second section, the corresponding key for that section is transmitted to the customer and the key for the previous section is destroyed. Subsequent key transmission is in response to a timer at the video rental service provider's system or an automatic next key request generated at the customer's computer system when playback of a current section is completed or nearly completed. Timer-based automatic key requests are feasible, for example, where videos are segmented such that playback of each encrypted section takes a predetermined length of time. A key request timer is preferably adapted to stop if playback of a section is stopped, to prevent a premature key request before a subsequent section is ready for playback. In another embodiment, a key request is made when a predetermined control signal or data pattern, added to each section of the video by the video provider, is encountered during playback. The customer thus always has a key to unlock a current section, but should at no time possess the full set of keys.

A method for controlling the use of data content downloaded to a customer system using a data network such as the Internet is thereby provided. The customer logs on to a data content provider server and requests to use previously downloaded data content. In one embodiment, customer login and request involves transmitting customer verification information and order information input by the customer from a customer interface to the data content provider server. The customer verification information includes such information as network address and customer ID number. The customer verification information is then compared with corresponding stored customer information accessible to the data content service provider, and the order information may also be compared with customer rental records maintained by the service provider. For legitimate requests, a usage charge is billed to the customer's account, and a key required to unlock a first section of the data content is transmitted to the customer. A different key is transmitted to the customer at an appropriate time to enable the customer to use the next section of the data content, preferably without any interruption, and the first key and any related decrypted data content from the first section is destroyed at the customer's computer system. The customer then possesses only a subset of a full set of keys required to decrypt the sections of the data content. Customer equipment is configured such that no keys are permanently stored.

Thus, according to a broad aspect of the invention, a method of receiving and controlling playback of data content such as video and music is provided. In one embodiment, data content is requested from a rental service provider and received at a customer processing platform over a communications medium. The data content includes a plurality of encrypted sections, each of which has been encrypted using a respective key. For each encrypted section, the customer processing platform is configured to receive the key in respect of the encrypted section, to decrypt and play back the resultant decrypted section using the key, and, after completing playback of the encrypted section, to destroy the key.

The foregoing systems and methods are implemented as a computer readable medium containing software code executable by a processing platform in an embodiment of the invention. The computer readable medium includes first program means for coordinating downloading of data content to a computer system from a data content service provider, and second program means for using the data content. The second program means establishes communications with the data content service provider to obtain permission before the data content can be used. In some embodiments, the second program means requires further permissions to be obtained from the data content service provider from time to time in order to continue using the data content or sections thereof.

As described briefly above, control of data content downloading and use may be embodied in software such as a browser plug-in. In embodiments that support download of this software itself to a processing platform, the invention provides a signal embodied on a transmission medium containing software code executable by the processing platform, the software code including first program means for coordinating downloading data content to a customer computer system, and second program means for using the data content, which requires the establishment of a connection with a service provider to obtain permission before the data content can be used.

The systems and methods disclosed herein enable a data content service provider to address a global rental market with minimal capital investment. Close to video-on-demand real-time response is possible without imposing stringent requirements on the data network.

Some measure of protection against unauthorized copying of rented data content is also provided. Sections of rented data content are encrypted with a set of digital keys, as described above. Customers require digital keys to use the data content, and different sections require different keys. The keys are transmitted, one at a time, to authorized customers, which can easily be identified through their IP addresses for instance. After a customer receives a new key, any previous key is destroyed. As such, the customer possesses only a subset, preferably only one, of the set of keys at any time. In one embodiment, this aspect key management is performed by key control software that is provided to a customer by a data content provider. In another embodiment, a delete key command is sent to a customer processing platform or computer system from a data content server or system each time a new key is transmitted. In both these embodiments, the data content provider causes keys to be destroyed at a customer system, by providing key control software in the former embodiment, and by providing an explicit command in the latter.

Key length is typically on the order of bits or bytes as opposed to megabytes and gigabytes for common data content types such as video. Downloading of keys therefore takes very short time. As such, a new key is preferably transferred to a customer just before use or processing of a current data content section has been completed, to limit the time that a customer possesses keys for more than one data content section. In a preferred embodiment, a new key is transmitted to a customer less than 1 second before the new key is required for decryption and use of a subsequent section of the data content.

Customers benefit from being able to use previously downloaded data content, viewing a video for example, at any time without restraints related to broadcasting schedules and with no need to visit a video rental store for selection of the video or returning the video. Selections are made by customers at their own convenience, and from the comfort and privacy of their own home or some other location. New movie releases are never "sold out", as they frequently are in existing video rental stores. Another advantage to consumers is the ultimate lower rental cost occasioned by the significant reduction of such rental service provider costs as real estate costs and labour costs associated with existing video rental stores. Because a virtually unlimited selection of videos is available, video distribution systems and methods as disclosed herein provide a much greater selection than any existing video rental store.

From an access perspective, full access to video content can be provided for those who live in geographically remote or sparsely populated areas that tend to have little or no access to video rental stores. Such enhanced access is also advantageous for families with young children, elderly persons, and handicapped persons where theatre viewing and round trips to video rental stores are inconvenient, prohibitive or expensive.

Figure 4:
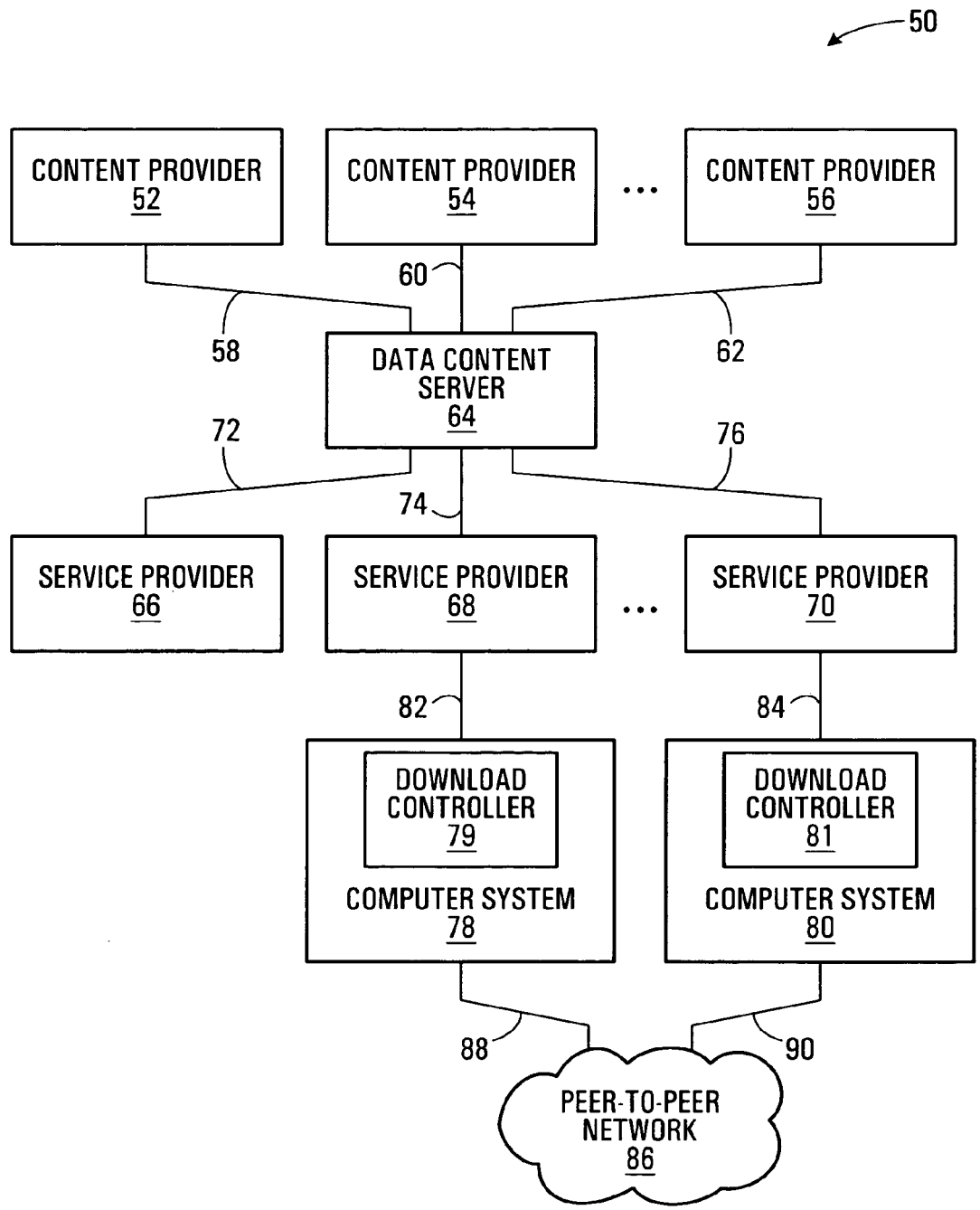
FIG. 4 is a block diagram of a data content rental system according to another embodiment of the invention.

The foregoing description relates primarily to embodiments of the invention in which customers obtain data content and required decryption keys from data content providers. FIG. 4 is a block diagram of a content rental system according to another embodiment of the invention.

The system 50 in FIG. 4 includes a plurality of data content providers 52, 54, and 56 connected to a data content server 64 via connections 58, 60, and 62. The data content server is connected to service providers 66, 68, and 70 via the connections 72, 74, and 76. Customer computer systems 78 and 80, each including a respective download controller 79 and 81, communicate with the service providers 68 and 70 via connections 82 and 84, and with each other via a peer-to-peer network 86 and connections 88 and 90. Although shown as a single line in FIG. 4, each of the connections 58, 60, 62, 72, 74, 76, 82, 84, 88, and 90 may be a direct or an indirect connection. In many implementations, at least some of these connections are made through one or more communication networks, including the Internet, and intermediate systems and servers supporting such network connections.

As described above with reference to FIG. 1, the invention is in no way limited to the particular components shown in FIG. 4. Although only three data content providers 52, 54, and 56, one data content server 64, three service providers 66, 68, and 70, and two computer systems 78 and 80 connected by a single peer-to-peer network 86 are shown, systems according to the present embodiment of the invention may be implemented with further, fewer, or different components. For example, one contemplated implementation includes multiple data content servers having many different associated content providers and service providers that provide service to many more customers. In addition, the peer-to-peer network 86 is one example of a means for communication between computer systems. Many other types of systems are known for inter-computer system communications. Further variations of the system 50 will be apparent to those skilled in the art without departing from the present invention.

In the system 50, the function of providing data content is effectively separated from the functions of encrypting, distributing, and controlling use of the data content. Data content is available to the data content server 64 from any of a plurality of data content providers, three of which are shown at 52, 54, and 56. Each data content provider 52, 54, and 56 makes its data content available to the data content server 64, such as by forwarding new data content to the data content server 64 as it becomes available.

However, it should be appreciated that the data content providers 52, 54, and 56 may instead send identifiers of available data content to the data content server 64, which then requests the data content from the providers as required. In this case, the data content server 64 preferably maintains a record of available data content and the data content provider(s) from which such content is available. Where the same data content is available from more than one of the data content providers 52, 54, and 56, the data content server 64 may also establish an order of preference between data content providers. Such preferences may be based on a pricing agreement or other relationship between the data content server 64 and each data content provider or a type or speed of the connection between the data content server 64 and each data content provider, for example, and reflected in the records of available data content. Preferences may be inherent in the order in which data content providers are listed in each record or explicitly indicated in the records, for instance.

In a further embodiment, the data content server 64 requests data content, as it is needed, from any of the plurality of data content providers 52, 54, and 56. According to one request scheme, requests are sent to one data content provider at a time, in order of preferences established, for example, as described above. The data content server 64 first submits a request to a most preferred data content provider. Upon receiving a response from that data content provider that the requested content is not available, or after a predetermined response time has elapsed without any response from the data content provider, the data content server 64 submits a request for the data content to a next data content provider. This process is preferably repeated until either the requested data content is received from a data content provider or the data content server 64 has requested the data content from all data content providers 52, 54, and 56 without success. In an alternate request scheme, data content is requested by the data content server 64 from the plurality of data content providers 52, 54, and 56 substantially simultaneously. Requests are submitted to all data content providers without awaiting responses. This latter request scheme provides for a faster determination by the data content server 64 that requested data content is not available from any of the data content providers 52, 54, and 56. This parallel request mechanism may also provide for faster retrieval of the data content, particularly where the data content is not available from one or more of the data content providers or the connections 58, 60, and 62 support different data transfer rates, for example. In a hybrid request scheme, preferences are established for groups of data content providers, and requests are submitted to the data content providers in each group in order of preference.

Many options are also possible for controlling the timing of requests for data content from the data content server 64 to the data content providers 52, 54, and 56. As will be apparent from the foregoing, requests for data content are made by the data content server 64 where the data content server either stores available data content records or requests data content as it is needed. For example, requests may be submitted to any of the plurality of data content providers 52, 54, and 56 when such data content is requested by a consumer or when the data content is to be made available data content server 64, such as when new data content is released or a data content library is being built by the data content server 64.

Received data content is preferably stored at the data content server 64 so that previously requested and received data content need not be requested from a data content provider if required again at a later time. In a particularly preferred embodiment, the data content server 64 segments and encrypts any received data content as described above and locally stores the encrypted data content. Local storage of encrypted data content provides for near real-time response to consumer requests for data content.

The service providers 66, 68, and 70 communicate with the data content server 64 to obtain encrypted data content and the decryption keys required to decrypt the encrypted data content. Communications over the links 72, 74, and 76 are preferably secure, particularly where actual decryption keys are transferred from the data content server 64. Any of the key protection techniques described above may be applied to key transfer between the data content server 64 and the service providers 66, 68, and 70. However, the service providers are preferably provided with the full set of decryption keys required to decrypt encrypted data content, as well as any other information, such as a custom software application, module, or plug-in, required by a customer to use the data content. Each service provider 66, 68, and 70 is thereby enabled to respond to consumer requests to download and/or use data content, offloading such functions from the data content server 64.

The distribution of encrypted data content and decryption keys from the data content server 64 to the plurality of service providers 66, 68, and 70 may be managed according to any of the techniques described above for distribution of data content from the data content providers 52, 54, and 56 to the data content server 64. Thus, the data content server 64 may send encrypted data content and decryption keys to the service providers 66, 68, and 70 as it becomes available, or in response to requests from the service providers.

The service providers 66, 68, and 70 provide the data content rental service to customers in the system 50. User registration, authentication, login, content requests, content use requests, and the like are handled by the service providers 66, 68, and 70. In FIG. 4, users of the computer systems 78 and 80 are registered customers of the service providers 68 and 70, respectively. Of course, this particular arrangement is intended for illustrative purposes only. The users of the computer systems 78 and 80 may be registered with a plurality of service providers or the same service provider, for example.

The download controllers 79 and 81 control the downloading and use of data content substantially as described above.

In one of a plurality of operating modes, the download controllers 79 and 81 function substantially as described above to download encrypted data content from the service providers 68 and 70 over the connections 82 and 84. In another operating mode, the download controllers 79 and 81 download encrypted data content from other sources than the service providers 66, 68, and 70, including other users.

Peer-to-peer communication techniques, represented in FIG. 4 by the peer-to-peer network 86, are commonly used to share files between computer systems. Although data content is available through the service providers 66, 68, and 70, users are also encouraged to share encrypted data content with other users. For example, after encrypted data content is downloaded to the computer system 78 from the service provider 68, the computer system 78 effectively becomes another distribution point for the encrypted data content. Downloaded encrypted data content is then available to the computer system 80 and other computer systems through the peer-to-peer network 86. On-line file sharing services are among the most common means for sharing data between computer systems. However, it should be appreciated that downloaded encrypted data may be shared using other distribution channels, including but not limited to email and such portable storage media as CDs, DVDs, diskettes, and memory cards. Thus, the peer-to-peer network 86 is shown in FIG. 4 as one illustrative example of the many possible mechanisms for sharing encrypted data content between computer systems and users.

The system 50 thereby significantly expands the data content distribution network without sacrificing the data content protection. Only the data content, not the required decryption keys, are shared between users. As described above, keys are stored only in temporary memory, preferably not accessible to a user, and deleted when processing of an encrypted section of data content is complete, such that a user is never in possession of a full set of required keys. User- or location-specific keys or transmission values provide a further level of key protection, preventing a second user from using keys provided to a first user to enable use of downloaded encrypted data content by the first user.

In order to use encrypted data content, regardless of the source from which the content was obtained, keys must be obtained from one of the service providers 66, 68, and 70. Processing and use of encrypted data proceed substantially as described above. The system 50 embodies alternative data content distribution mechanisms, but the underlying data content security scheme may be substantially the same as described above.

A free-download business model or method is particularly relevant in conjunction with the system 50. Since users are encouraged to distribute downloaded content, such content is preferably provided free of charge. Users are then charged for using the downloaded content, when video content is viewed, for example.

Various sectors of the entertainment industry are making efforts to curb distribution of music and video content between users such as described above in conjunction with FIG. 4. A primary motivation for these efforts is the fact that such distribution detracts from purchase and/or rental revenues. However, the system 50 combats this so-called piracy by both making data content difficult to copy in a usable form and taking away incentive to copy. As described above, the use of any data content requires connection to a data content server or service provider and user authentication or other verification. In addition, data content is protected with multiple keys, of which a user is in possession of only a subset at any time. The incentive to copy data content is substantially reduced where distribution cost savings associated with the systems described herein are passed on to consumers. The speed of distribution of data content according to aspects of the invention further reduces incentive to copy. For example, relatively low-cost, authorized copies of a newly released movie can be made widely available before unauthorized parties are able to defeat protection mechanisms established by the movie studio releasing the movie.

According to another embodiment of the invention, the use of data content requires a software program or module such as a plug-in. This embodiment provides even greater protection of data content, and may be used in conjunction with either of the distribution schemes described above.

The required software program may be incorporated in download controller software, which may itself be downloaded, or a separate software component that is downloaded either with a first data content download or the first time that a user requests to use any data content. The software program preferably requires a customer to establish a connection with a service provider and obtain keys or permission to use the data content. The customer may be required to enter certain information in order to gain permission. After any such information has been verified, permission is granted and a charge is billed to the customer's account or credit card. The customer may then begin to use the data content. During use of the data content, the customer preferably stays connected to the service provider, and from time to time further permissions from the service provider are required for continued use of the data content. In this embodiment, the data content is not necessarily segmented or encrypted. Such a required software program may also be adapted to perform such functions as determining a configuration of a customer computer system and reporting the configuration back to the service provider. The service provider is then able to detect unrecognized or illegal hardware and possibly software and take appropriate action, such as suspending or cancelling a customer account and denying any further permissions and/or key requests.

While this invention has been described with an emphasis upon preferred embodiments, it will be obvious to those of ordinary skills in the art that variations in the preferred systems and methods may be used, and that it is intended that the invention may be practised otherwise than as specifically described herein. Accordingly, this invention includes all modifications encompassed within the spirit and scope of the invention as defined by the claims that follow.

It is noted that the system does not necessarily prevent copying of data content and a key to another system. However, as described above, a customer does not have possession of a full set of decryption keys required to fully decrypt data content. Such techniques as tracking of data content when the user requests to use the file and generation of decryption keys based on key seed values and a unique identifier that cannot be mimicked by other computer systems offer additional security against piracy.

Several transfer schemes for providing data content from data content providers to a data content server and for providing encrypted data content and keys from a data content server to service providers have been described above with reference to FIG. 4. In a further embodiment, a data content server and a data content provider are configured to support querying, discovery, or other operations that enable the data content server to determine the data content available from the data content provider. A data content provider could similarly be enabled to query or discover data content servers so as to maximize distribution and availability of its data content. Such functionality may also be provided between service providers and data content servers, and possibly between service providers and data content providers.

In addition, each data content provider and service provider in FIG. 4 need not implement the same schemes or protocols for communication with the data content server as other providers. For example, the data content provider 52 might provide its data content to the data content server 64 as it becomes available, whereas the data content provider 54 provides data content in response to requests from the data content server 64.

Although particular examples of division of functions between data content providers, a data content server, and service providers in the system 50 of FIG. 4 have been described above, it should be appreciated that the invention is in no way restricted thereto. As described above, for instance, the data content server 64 splits received data content into sections and encrypts each section, these functions may instead be performed by the service providers 66, 68, and 70, depending upon a level of trust between the data content server and the service providers.

It should also be appreciated that users are preferably not restricted to any particular service provider. Referring to FIG. 4, where the user of the computer system 78 downloads encrypted data content from the service provider 68 and then shares the encrypted data content with the user of the computer system 80, the user of the computer system 80 can preferably obtain required decryption keys from the service provider 70. It is also contemplated that a customer might download data content from one service provider but use a different service provider to obtain keys or permission to use the data content. Thus, a customer may obtain data content from one service provider within a service provider system or from another customer and then establish communications with the service provider or another service provider in the service provider system to obtain keys or permission to use the data content.

The invention claimed is:

1. A method of delivering data content from a data content provider to a customer processing platform and controlling use of the data content at the customer processing platform, comprising:
    encrypting each of a plurality of sections of the data content using a respective one of a plurality of encryption keys to produce a corresponding plurality of encrypted sections;
    delivering the plurality of encrypted sections to the customer processing platform; and
    delivering to the customer processing platform a plurality of decryption keys corresponding to the plurality of encryption keys, wherein the decryption keys are delivered in a manner such that the customer processing platform has simultaneous possession of at most a subset of the plurality of decryption keys at any time, wherein delivering the plurality of decryption keys comprises:
    delivering to the customer processing platform a current key of the plurality of decryption keys;
    delivering to the customer processing platform a next key of the plurality of decryption keys; and
    causing the current key to be destroyed at the customer processing platform only after at least the next key of the plurality of decryption keys has been received.

2. The method of claim 1, wherein delivering to the customer processing platform a next key of the plurality of decryption keys and causing the current key to be destroyed at the customer processing platform are repeated for each of the plurality of encrypted sections to be subsequently processed.

3. The method of claim 1, wherein the current encrypted section is a first one of the plurality of encrypted sections, and wherein delivering to the customer processing platform a next key of the plurality of decryption keys and causing the current key to be destroyed at the customer processing platform are repeated for each of the plurality of encrypted sections following the first encrypted section.

4. The method of claim 1, wherein delivering to the customer processing platform a plurality of decryption keys comprises:
    providing key control software to the customer processing platform, the key control software being adapted to:
    receive the current decryption key for the current encrypted section of the plurality of encrypted sections;
    receive the next decryption key for the next encrypted section of the plurality of encrypted sections;
    complete decryption of the current section;
    begin decryption of the next section; and
    destroy the current decryption key after decryption of the next section has begun.

5. The method of claim 1 further comprising:
    billing a customer for delivery of the encrypted sections, and then billing the customer each time the data content is used at the customer processing platform.

6. The method of claim 1, wherein the data content is video content or music content, and wherein use of the data content at the customer processing platform comprises decryption and playback of the data content.

7. The method of claim 1, wherein each of the plurality of encryption keys comprises a respective symmetric cryptographic key, and wherein each of the plurality of decryption keys comprises the symmetric cryptographic key of its corresponding encryption key.

8. The method of claim 1, further comprising:
    generating each of the plurality of encryption keys using an identifier associated with the customer processing platform, to thereby generate a plurality of customer processing platform-specific keys.

9. The method of claim 8, wherein generating comprises generating each of the plurality of customer processing platform-specific keys using the identifier and a respective key generation seed value.

10. The method of claim 9, wherein delivering to the customer processing platform a plurality of decryption keys comprises delivering the respective key generation seed values.

11. The method of claim 1, further comprising:
    generating a respective transmission value for each of the plurality of encryption keys using an identifier associated with the customer processing platform,
    wherein delivering to the customer processing platform a plurality of decryption keys comprises delivering the transmission values.

12. The method of claim 1, further comprising:
    delivering the plurality of encrypted sections from the customer processing platform to a second customer processing platform via a peer-to-peer network; and
    delivering the plurality of decryption keys from the data content provider to the second customer processing platform, wherein the decryption keys are delivered in a manner such that the second customer processing platform has simultaneous possession of at most a subset of the plurality of decryption keys at any time, wherein the plurality of decryption keys are encrypted using a public cryptographic key corresponding to a private cryptographic key known only to the customer processing platform.

13. A computer-readable medium storing instructions which, when executed by a processor at a data content provider, perform a method according to claim 1.

14. A method of receiving and controlling playback of video data content at a customer processing platform, comprising:
the customer processing platform performing steps of:
receiving over a communications medium a plurality of encrypted sections of video data content, each of which has been encrypted using a respective encryption key; and
for each encrypted section:
receiving a respective decryption key in respect of the encrypted section before playback of a preceding encrypted section of the plurality of encrypted sections is complete;
decrypting and playing back the encrypted section using the respective decryption key; and
destroying the respective decryption key only after at least a respective decryption key in respect of a next encrypted section has been received, such that contiguous playback of the encrypted sections of video data content is provided and at any time the customer processing platform has simultaneous possession of at most a subset of the decryption keys corresponding to the plurality of encrypted sections of video data content.

15. The method of claim 14, further comprising, for each encrypted section:
destroying decrypted video data content at the customer processing platform after completing playback of the encrypted section.

16. The method of claim 14, wherein the communications medium is the public Internet.

17. The method of claim 14, wherein, for each encrypted section, the respective encryption key is the same as the respective decryption key.

18. The method of claim 14, wherein receiving the plurality of encrypted sections of the video data content comprises receiving the plurality of encrypted sections of the video data content from another customer processing platform via a peer-to-peer network, and wherein, for each encrypted section, the decryption key is encrypted using a public cryptographic key corresponding to a private cryptographic key known only to the customer processing platform.

19. A computer-readable medium storing instructions which, when executed by a customer processing platform, perform a method according to claim 14.

20. The method of claim 14, wherein each encryption key comprises a respective customer processing platform-specific key which is determined based on an IP address of the customer processing platform.

21. The method of claim 14, wherein receiving each respective decryption key comprises receiving a transmission value that is determined based on the respective decryption key and a hardware identifier associated with the customer processing platform, further comprising, for each encrypted section:
recovering the respective decryption key from the transmission value.

22. A method for controlling use of encrypted video data content downloaded to a customer data content processing device, comprising:
receiving a request comprising customer verification information from a customer data content processing device;
comparing the customer verification information with corresponding stored customer information; and
where the customer verification information is consistent with the stored customer verification information:
billing a usage charge to an account of the customer;
transmitting to the customer data content processing device a digital key to decrypt a current portion of the encrypted video data content; and
for each subsequent portion of the encrypted video data content:
transmitting to the customer data content processing device a different key to decrypt the subsequent portion of the encrypted video data content before playback of a preceding portion of the encrypted video data content is complete; and
causing a key for a preceding portion of the encrypted video data to be deleted from the customer data content processing device only after at least the key to decrypt the subsequent portion of the encrypted data has been received by the customer data content processing device, such that contiguous playback of the portions of encrypted video data content is provided and at any time the customer processing platform has simultaneous possession of at most a subset of the decryption keys corresponding to the encrypted video data content.

23. A computer readable medium storing software code executable by a processing platform that when executed by the processing platform cause the processing platform to perform a method comprising:
coordinating downloading a plurality of sections of data content each encrypted with a respective one of a plurality of encryption keys to a customer computer system from a data content service provider system or another customer computer system;
establishing a connection with the data content service provider system to obtain permission to use the data content; and
using the data content where permission is obtained from the data content service provider system by receiving a corresponding one of a plurality of decryption keys for each encrypted section of data content and decrypting the encrypted section using the corresponding one of the plurality of decryption keys such that the processing platform has simultaneous possession of at most a subset of the plurality of decryption keys at any time,
wherein for each encrypted section of data content the processing platform destroys the received decryption key corresponding to the encrypted section of data content only after receiving at least the decryption key corresponding to the next encrypted section of data content.

24. The computer readable medium of claim 23, wherein the processing platform obtains further permissions from the data content service provider system to continue using the data content.

25. A system for delivering data content from a data content provider to a customer processing platform and controlling use of the data content at the customer processing platform, comprising:
means for encrypting each of a plurality of sections of the data content using a respective one of a plurality of encryption keys to produce a corresponding plurality of encrypted sections;
means for delivering the plurality of encrypted sections to the customer processing platform; and
means for delivering to the customer processing platform a plurality of decryption keys corresponding to the plurality of encryption keys, wherein the decryption keys are delivered in a manner such that the customer processing platform has simultaneous possession of at most a subset of the plurality of decryption keys at any time, wherein the means for delivering the plurality of decryption keys comprises:
means for delivering to the customer processing platform a current key of the plurality of decryption keys; and
means for delivering to the customer processing platform a next key of the plurality of decryption keys,
the customer processing platform comprising:
means for destroying the current key at the customer processing platform only after at least the next key of the plurality of decryption keys has been received.

26. The system of claim 25, wherein the customer processing platform comprises:
means for requesting the data content to be delivered to the customer processing platform via a peer-to-peer network connection;
means for receiving the plurality of encrypted sections via the peer-to-peer network connection;
means for receiving, for each encrypted section, the decryption key in respect of the encrypted section over an encrypted decryption key delivery channel; and
means for decrypting and playing back the encrypted section using the decryption key, wherein
the means for destroying the current decryption key comprises means for destroying the current decryption key after completing playback of the current encrypted section and beginning playback of the next encrypted section.

27. A data content distribution system comprising:
a data content server that receives download requests and permission requests for data content, that encrypts a plurality of sections of requested data content using respective encryption keys to thereby generate a plurality of encrypted sections and that transmits the encrypted sections of the data content in response to a received download request for the data content, and that transmits each of a plurality of decryption keys respectively corresponding to the encryption keys in response to a permission request for the data content; and
a data content download controller that generates download requests, that receives encrypted sections of data content in response to download requests, that generates permission requests when downloaded data content is to be used, and for each encrypted section of data content to be used, receives a corresponding one of the plurality of decryption keys, and that decrypts the encrypted section using the corresponding one of the plurality of decryption keys;
wherein said data content server transmits the plurality of decryption keys in a manner such that the data content download controller has simultaneous possession of at most a subset of the plurality of decryption keys at any time, wherein, for each encrypted section, the data content download controller destroys the decryption key corresponding to the encrypted section only after at least the decryption key corresponding to the next encrypted section of the plurality of encrypted sections has been received.

28. The system of claim 27, comprising a data network connecting the data content server and the data content download controller.

29. The system of claim 28, further comprising a plurality of data content download controllers connected to the data network.

30. The system of claim 29, wherein each of the plurality of data content download controllers is implemented in conjunction with a respective customer computer system and each data content download controller downloads encrypted sections of data content from other customer computer systems.

31. The method of claim 1, wherein causing the current key to be destroyed at the customer processing platform comprises:
causing the current key to be destroyed at the customer processing platform after processing of the current encrypted section of the plurality of encrypted sections with the current key has been completed and processing of a next encrypted section of the plurality of encrypted sections with the next key has begun.

32. The method of claim 1, wherein causing the current key to be destroyed at the customer processing platform comprises:
causing the current key to be destroyed at the customer processing platform before processing of the next encrypted section has been completed.

33. The method of claim 1, wherein:
delivering to the customer processing platform a plurality of decryption keys comprises:
delivering the plurality of decryption keys to the customer processing platform over an encrypted decryption key delivery channel; and
delivering the plurality of encrypted sections to the customer processing platform comprises:
providing the plurality of encrypted sections to a peer-to-peer network, wherein the customer processing platform downloads the plurality of encrypted sections via the peer-to-peer network.

34. The method of claim 22, wherein causing a key for a preceding portion of the encrypted data to be deleted comprises:
causing the key for the preceding portion of the encrypted data to be deleted from the customer data content processing device only after decryption of the subsequent portion of the encrypted data has begun.

35. The computer readable medium of claim 23, wherein the processing platform destroys the received decryption key corresponding to the encrypted section of data content only after decryption of the next encrypted section of data content has begun.

36. The system of claim 25, wherein the means for causing the current key to be destroyed at the customer processing platform comprises:
means for causing the current key to be destroyed at the customer processing platform after processing of the current encrypted section of the plurality of encrypted sections with the current key has been completed and processing of a next encrypted section of the plurality of encrypted sections with the next key has begun.

37. The system of claim 25, wherein the means for causing the current key to be destroyed at the customer processing platform comprises:
means for causing the current key to be destroyed at the customer processing platform before processing of the next encrypted section has been completed.

38. The system of claim 25, wherein:
the means for delivering to the customer processing platform a plurality of decryption keys comprises:
means for delivering the plurality of decryption keys to the customer processing platform over an encrypted decryption key delivery channel; and
the means for delivering the plurality of encrypted sections to the customer processing platform comprises:

a peer-to-peer network, wherein the customer processing platform downloads the plurality of encrypted sections via the peer-to-peer network.

39. The system of claim 27, wherein the data content download controller destroys the decryption key corresponding to the encrypted section only after decryption of the encrypted section has completed and decryption of the next encrypted section of the plurality of encrypted sections with the decryption key corresponding to the next encrypted section of the plurality of encrypted sections has begun.

40. The system of claim 30, comprising an encrypted decryption key channel for delivery of the plurality of decryption keys, wherein the data network comprises a peer-to-peer network connecting the customer computer systems to share the encrypted sections of data content, and wherein the encrypted decryption key channel is separate from the peer-to-peer network.

41. The method of claim 14, wherein destroying the respective decryption key only after at least the respective decryption key in respect of the next encrypted section has been received comprises destroying the respective decryption key only after completing playback of the encrypted section and beginning contiguous playback of the next encrypted section.

42. The method of claim 14, further comprising, for each encrypted section:
 requesting the respective decryption key in respect of a next encrypted section responsive to one of a control signal and a data pattern in the decrypted data content of an encrypted section that precedes the next encrypted section.

43. The method of claim 22, further comprising, for each subsequent portion of the encrypted data:
 receiving a request from the customer data content processing device for the different key to decrypt the subsequent portion of the encrypted data, wherein the request was generated responsive to one of a control signal and a data pattern in the decrypted data content of a preceding portion of the encrypted data content during playback of the preceding portion of the encrypted data content.

* * * * *